United States Patent Office.

DAVID YOUNG, OF KOKOMO, INDIANA.

Letters Patent No. 93,941, dated August 17, 1869.

IMPROVED COMPOSITION FOR PLASTERING WALLS.

The Schedule referred to in these Letters Patent and making part of the same.

*To all whom it may concern:*

Be it known that I, DAVID YOUNG, of Kokomo, in the county of Howard, and State of Indiana, have invented an Improved Plaster for Plastering Walls, &c.; and I do hereby declare that the following is a full, clear, and exact description thereof.

The nature of my invention consists in providing an improved plaster for plastering walls, ceilings, &c., composed of such ingredients as hereinafter set forth.

For the preparation of my improved plaster, I use the following ingredients, in substantially the following proportions, viz:

Nine (9) to ten (10) bushels of lime, which is slaked in the usual manner, "run off," and kept from thirty-eight to forty hours before the other substances are mixed with it.

Twenty-five (25) to thirty (30) bushels of sawdust, which has previously been sifted, so as to separate the chips, bark, &c., from it.

Two (2) bushels of hair.

The above are mixed together, and thoroughly worked, in the usual manner.

Heretofore sand has been used, instead of sawdust, in the compounding of plaster; and the advantages, some of them, due to my composition, are—

The great difference in the weight of the materials, which is of great importance, particularly in plastering ceilings, as it is owing to the weight of the plaster, in the composition of which sand is used, that it falls off the ceilings so often. Mine being very light, is not subject to this objection, and is, moreover, much more easily put on and worked. It will stick to a smooth board, or a board just from the saw, and lathing, as now required, may be dispensed with, while it sticks to brick or stone-work fully as well or better than the sand plaster now in common use. It may be used for the first and second coating, and will bear finishing up with the usual white coating, and when put on walls, is not liable to crack, crumble, or fall off.

Another advantage is, that in many localities, especially in new countries, where there are many saw-mills, sawdust is cheaper and more easily obtained than sand, thus making my plaster cheaper than that now in use.

In giving the ingredients for composing my plaster, I have stated those used in preparing the ordinary kind. If it is to be used for a very fine piece of work, I take about one (1) bushel of lime less, and substitute therefor, one (1) bushel of plaster of Paris, or the same quantity of hydraulic cement.

Having thus described my invention,

What I claim, and desire to secure by Letters Patent, is—

A plaster for plastering walls, &c., composed of the ingredients herein stated, and substantially in the proportions set forth.

In testimony whereof, I have signed my name to this specification, in the presence of two subscribing witnesses.

DAVID YOUNG.

Witnesses:
  WILLIAM P. VAILE,
  A. B. WALKER.